United States Patent [19]
Aoki et al.

[11] Patent Number: 5,985,977
[45] Date of Patent: Nov. 16, 1999

[54] RUBBER COMPOSITION AND PNEUMATIC TIRE USING SAME

[75] Inventors: Hirofumi Aoki, Saitama-ken; Shunji Araki, Tokyo, both of Japan

[73] Assignee: Bridgestone Corporation, Tokyo, Japan

[21] Appl. No.: 08/987,381

[22] Filed: Dec. 9, 1997

[30] Foreign Application Priority Data

Apr. 14, 1997 [JP] Japan .................................. 9-095741

[51] Int. Cl.$^6$ ...................................................... C08K 3/00
[52] U.S. Cl. ........................................... 524/495; 524/496
[58] Field of Search ..................................... 524/495, 496

[56] References Cited

U.S. PATENT DOCUMENTS

| | | | |
|---|---|---|---|
| 5,100,637 | 3/1992 | Nakai ........................ | 423/445 |
| 5,124,396 | 6/1992 | Branan, Jr. et al. ............ | 524/496 |
| 5,300,577 | 4/1994 | DiRossi et al. ................ | 525/237 |
| 5,447,971 | 9/1995 | Bergh et al. .................. | 523/213 |

FOREIGN PATENT DOCUMENTS

| | | |
|---|---|---|
| 20600195 | 6/1994 | European Pat. Off. . |
| WO9113944 | 9/1991 | WIPO . |
| WO9419412 | 9/1994 | WIPO . |

*Primary Examiner*—Edward J. Cain
*Attorney, Agent, or Firm*—Sughrue, Mion, Zinn, Macpeak & Seas, PLLC

[57] ABSTRACT

A rubber composition which comprises natural rubber and diene synthetic rubbers and carbon black having a cetyltrimethylammonium bromide surface area, a dibutyl phthalate absorption amount, a most frequent value of aggregate diameter distribution, a ratio of a half value width of aggregate diameter distribution to a most frequent value of aggregate diameter distribution, a ratio of a nitrogen adsorption specific surface area to an iodine adsorption amount, and a ratio of a cetyltrimethylammonium bromide surface area to an iodine adsorption amount in respective specific ranges, and a pneumatic tire prepared by using the rubber composition for a tread. The rubber composition and the pneumatic tire are excellent in all of abrasion resistance, resistance to tearing, and low heat buildup.

9 Claims, No Drawings

RUBBER COMPOSITION AND PNEUMATIC TIRE USING SAME

FIELD OF THE INVENTION

The present invention relates to a rubber composition and a pneumatic tire prepared by using the rubber composition. More particularly, the present invention relates to a rubber composition reinforced with carbon black which shows excellent abrasion resistance, resistance to tearing and low heat buildup, and a pneumatic tire having a tread prepared by using a reinforced rubber composition having the above properties.

PRIOR ART OF THE INVENTION

To improve abrasion resistance of tread rubber of pneumatic tires, properties of carbon black have heretofore been improved with respect to colloidal properties, such as the diameter of particles and the structure (aggregates). A technology in which the interaction between carbon black and polymer is enhanced by using carbon black having a smaller particle size and a high structure and the reinforcing property is improved by the enhanced interaction, and a technology in which abrasion resistance is improved by increasing surface activity of carbon black have generally been used to improve the properties of carbon black (Japanese Patent Application Laid-Open No. Showa 63-264647/1988 and Japanese Patent Application Laid-Open No. Heisei 1-275643/1989). A technology is recently proposed in which the content of components having larger diameters of aggregates which are considered to affect the reinforcement of rubber adversely is decreased by narrowing the width of distribution of the diameter of primary particles of carbon black (Japanese Patent Application Laid-Open No. Showa 63-264647/1988 and Japanese Patent Application Laid-Open No. Heisei 6-279624/1994).

However, decrease in the particle diameter of carbon black generally tends to deteriorate the property to exhibit low heat buildup (occasionally referred to as the heat buildup property, hereinafter), and the use of carbon black having decreased particle diameters causes a great problem for heavy duty pneumatic tires, such as tires for trucks and buses, which are frequently used under severe conditions. Moreover, the use of carbon black having an excessively decreased particle diameter causes problems in that the amount of the phase in which carbon black and polymer are bonded to each other, i.e., so-called carbon gel, is increased and viscosity of an uncured rubber composition is increased to markedly deteriorate processability, and that dispersion of carbon black in a rubber composition becomes inferior and abrasion resistance is adversely decreased.

When carbon black is used in an excessive amount, a problem arises in that the obtained rubber composition becomes excessively hard to cause difficulty in industrial processing. Moreover, dispersion of carbon black in the rubber composition becomes inferior, and a problem in the physical property arises in that improvement in abrasion resistance cannot be achieved.

When carbon black having a high structure is used, modulus of a rubber composition is increased to decrease elongation at break, and resistance to tearing (occasionally referred to as the tearing property, hereinafter) of rubber deteriorates.

The technology in which abrasion resistance is improved by increasing surface activity of carbon black has a problem in that elongation at break of rubber is decreased to affect the tearing property of rubber adversely, and the rubber composition cannot be used as tread rubber of heavy duty pneumatic tires which requires rubber having an excellent tearing property.

Therefore, conventional technologies for improving abrasion resistance using carbon black showed limited effects particularly for improving abrasion resistance of pneumatic tires in particular heavy duty pneumatic tires because the heat buildup property and the tearing property are adversely affected.

SUMMARY OF THE INVENTION

An object of the present invention is to provide a rubber composition having remarkably improved abrasion resistance without deteriorating the heat buildup property or the tearing property of the rubber composition.

Another object of the present invention is to provide a pneumatic tire prepared by using the rubber composition for a tread.

As the result of intensive studies by the present inventors to develop a rubber composition having the above advantageous properties, it was found that, when carbon black obtained by simply making carbon high structure is used, a tearing property is inferior, but that, when carbon black obtained by increasing carbon structure and decreasing a surface activity is used, the increase in modulus of a rubber composition reinforced with carbon black is suppressed, elongation at break of the rubber composition is increased, and an excellent tearing property is obtained. It was also found that, when carbon black obtained by simply decreasing the particle diameter is used, the heat buildup property of the rubber and dispersion of carbon black are inferior, and abrasion resistance superior to that of conventional rubber compositions cannot be expected, but that, when carbon black obtained by decreasing the particle diameter and broadening the width of distribution of aggregates is used, abrasion resistance of a rubber composition reinforced with carbon black is remarkably improved while deterioration in the heat buildup property and dispersion can be suppressed. The present invention has been accomplished based on the above knowledges.

Accordingly, the present invention provides a rubber composition which comprises 100 parts by weight of a rubber component comprising at least one rubber selected from the group consisting of natural rubber and diene synthetic rubbers and 30 to 70 parts by weight of carbon black having (a) a cetyltrimethylammonium bromide surface area (CTAB) of 120 to 155 m$^2$/g, (b) a dibutyl phthalate absorption amount (DBP) of 130 to 170 ml/100 g, (c) a most frequent value of aggregate diameter distribution ($D_{mode}$) of 80 nm or more, (d) a ratio ($\Delta D_{50}/D_{mode}$) of a half value width of aggregate diameter distribution ($\Delta D_{50}$) to a most frequent value of aggregate diameter distribution ($D_{mode}$) of 0.80 to 1.00, (e) a ratio ($N_2SA/IA$) of a nitrogen adsorption specific surface area ($N_2SA$) to an iodine adsorption amount (IA) of 0.85 to 0.97, and (f) a ratio (CTAB/IA) of a cetyltrimethylammonium bromide surface area (CTAB) to an iodine adsorption amount (IA) of 0.70 to 0.90.

The present invention also provides a pneumatic tire prepared by using the above rubber composition for a tread.

DETAILED DESCRIPTION OF THE INVENTION

The rubber composition of the present invention comprises a rubber component comprising at least one rubber selected from the group consisting of natural rubber and diene synthetic rubbers and carbon black having specific colloidal properties.

Examples of the diene synthetic rubber include polybutadiene rubber, polyisoprene rubber, and styrene-butadiene copolymer rubber. The rubber component in the present invention is preferably a blend of 10 to 60 parts by weight of cis-1,4-polybutadiene rubber and 40 to 90 parts by weight of natural rubber or polyisoprene rubber.

The properties of carbon black used in the present invention are measured in accordance with the following methods:

(1) CTAB is measured in accordance with the method of ASTM 3765-80.

(2) IA and DBP are measured in accordance with the method of Japanese Industrial Standard K6221-1982 (method A).

(3) $N_2SA$ is measured in accordance with the method of ASTM D3037-88.

(4) The aggregate diameter distribution is measured by centrifugal sedimentation using a disk centrifuge photosedimentometer (DCF) manufactured by Joyce Loebl Co. in accordance with the following procedures. A sample of dried carbon black is accurately weighed and mixed with a 20% aqueous solution of ethanol containing a small amount of a surfactant, and a dispersion containing 50 mg/liter of carbon black is prepared. Carbon black is thoroughly dispersed in the dispersion by using ultrasonic wave, and a sample solution is obtained. The revolution of DCF is set at 8000 rpm. After 10 ml of a spinning fluid (distilled water) is added, 1 ml of a buffer solution (a 20% aqueous solution of ethanol) is injected. Then, 0.5 ml of the sample solution is added using a syringe, and a curve of aggregate diameter distribution is obtained by the method in which the sedimentation is immediately started.

The stokes-corresponding diameter showing the most frequent value in the obtained curve is defines as $D_{mode}$. The difference in two diameters showing a half of the maximum value on larger and smaller sides of the diameter showing the maximum value (the half value width) is defined as $\Delta D_{50}$.

In the present invention, carbon black has a cetyltrimethyl-ammonium bromide surface area (CTAB) of 120 to 155 $m^2/g$, preferably 125 to 150 $m^2/g$. When CTAB is less than 120 $m^2/g$, abrasion resistance cannot be maintained at a satisfactory level. When CTAB exceeds 155 $m^2/g$, processability and the heat buildup property of a vulcanized rubber composition are inferior. Carbon black has a dibutyl phthalate absorption amount (DBP) of 130 to 170 ml/100 g, preferably 135 to 160 ml/100 g. When DBP is less than 130 ml/100 g, a sufficient effect of improving abrasion resistance is not obtained. When DBP exceeds 170 ml/100 g, processability and tensile properties of a vulcanized rubber composition are inferior, and the tearing property is also inferior.

Carbon black has an index for surface activity, i.e., a ratio ($N_2SA/IA$) of a nitrogen adsorption specific surface area ($N_2SA$) to an iodine adsorption amount (IA), of 0.85 to 0.97, preferably 0.87 to 0.95. When this ratio exceeds 0.97, the elongation at break decreases even when DBP is in the range of the present invention, and the tearing property is adversely affected. The lower limit of the ratio is 0.85 because of restriction in the production of carbon black.

Carbon black has a most frequent value of aggregate diameter distribution ($D_{mode}$) of 80 nm or more. When $D_{mode}$ is less than 80 nm, dispersion of carbon black and the heat buildup property markedly deteriorate. The upper limit of $D_{mode}$ is 120 nm because of restriction in the production of carbon black in the present region. Carbon black has a ratio ($\Delta D_{50}/D_{mode}$) of a half value width of aggregate diameter distribution ($\Delta D_{50}$) to a most frequent value of aggregate diameter distribution ($D_{mode}$) of 0.80 to 1.00. When this ratio is less than 0.80, dispersion of carbon black and the heat buildup property markedly deteriorate. Carbon black has a ratio (CTAB/IA) of CTAB to IA of 0.70 to 0.90, preferably 0.75 to 0.85. When this ratio is less than 0.70, the production of carbon black becomes difficult. When this ratio exceeds 0.90, the tearing property is inferior.

The above carbon black used in the present invention can be produced, for example, by using a furnace for producing carbon black similar to the furnace disclosed in FIG. 1 in the specification of Japanese Patent Application Laid-Open No. Heisei 4-264165/1992. The furnace comprises a chamber for introducing a combustible fluid (inner diameter: 450 mmφ, length: 400 mm) having a cylinder for introducing an oxygen-containing gas (inner diameter: 250 mmφ, length: 300 mm) inside which a plate for adjusting flow of the oxygen-containing gas introduced from outer peripheries of the head of the furnace is disposed and an apparatus for introducing fuel disposed at the central axis of the chamber; a converging chamber (inner diameter at the upstream end: 370 mmφ, diameter at the downstream end: 80 mmφ, angle of convergence: 5.3 degrees) which is disposed at a downstream position of the above cylinder and converges in the downstream direction; a chamber for introducing feed stock oil which is disposed at a downstream position of the converging chamber and has a collective apparatus for spraying feed stock oil equipped with four separate planes each having four spraying apparatuses for the feed stock oil on the same plane; and a chamber for continuing reaction and cooling (inner diameter: 140 mmφ, length: 2000 mm) which is disposed at a downstream position of the chamber for introducing feed stock oil and equipped with a reaction chamber and an apparatus for spraying water with pressure to cool the reaction product rapidly to stop the reaction; the entire furnace being covered with refractories.

The condition of producing carbon black is described in more detail in the following. The surface area ($N_2SA$) can be adjusted by changing the ratio of the amount of the introduced material to the total amount of the introduced air (the oxygen-containing gas). The surface area is increased by increasing the total amount of the introduced air. The ratio of two indices with respect to the surface area, $N_2SA/IA$, can be adjusted by changing the position of stopping the reaction to form carbon black after the reaction has proceeded, i.e., by changing the time between introduction of the feed stock oil into the furnace and cooling. This ratio is decreased by stopping the reaction at a more downstream position (after a longer reaction time). When the condition of the operation of the furnace is adjusted so that the residence time in the region between the position of introduction of the feed stock oil (the most downstream position when a plurality of planes are used) and the position of rapid cooling exceeds 30 milliseconds, carbon black advantageously used in the present invention can be obtained. It is important in the present invention that the stokes-corresponding mode diameter ($D_{mode}$) and the ratio $\Delta D_{50}/D_{mode}$ as the properties of aggregates are adjusted in a greater range than the range for conventional carbon black. This adjustment can be achieved by adjusting the position of introduction of the feed stock oil and properties of the feed stock oil (temperature, viscosity, and pressure at the time of introduction). $D_{mode}$ can be increased by introducing the feed stock oil at a more upstream position, or by decreasing the temperature of the feed stock oil (increasing the viscosity). $\Delta D_{50}$ as an index of the aggregate distribution can be adjusted to a value showing a wider distribution by using a plurality of planes for introducing the feed stock oil and by changing the position of introduction of an alkali metal.

The amount of carbon black comprised in the rubber composition of the present invention is 30 to 70 parts by weight, preferably 40 to 60 parts by weight, per 100 parts by weight of the rubber component. When the amount is less than 30 parts by weight, the reinforcing effect is small, and the obtained rubber composition cannot be used actually. When the amount exceeds 70 parts by weight, the heat buildup property and the tearing property deteriorate, and the properties sufficient for heavy duty tires cannot be obtained.

The rubber composition of the present invention may additionally comprise vulcanizing agents, sulfur, vulcanization accelerators, antioxidants, softeners, and fillers, in accordance with necessity.

To summarize the advantages obtained by the invention, a rubber composition comprising carbon black having novel properties which are entirely different from those of conventional carbon black for improving abrasion resistance and a pneumatic tire prepared by using the rubber composition are provided. The pneumatic tire prepared by using the rubber composition of the present invention h as en tire properties including abrasion resistance, the tearing property, and the heat buildup property superior to the properties of conventional pneumatic tires.

EXAMPLES

The present invention is described in more detail with reference to examples and comparative examples. However, the examples and the comparative examples are not to be construed to limit the scope of the present invention.

Methods of Tests and Measurements

Tests and measurements in the examples and the comparative examples were conducted in accordance with the following methods.

(1) Test of abrasion resistance

Test tires of size 10.00R20 14 PR were attached to a truck having a load capacity of 10 tons, and the truck was driven on 100,000 km of good roads. Then, the remaining depth of grooves were measured. The result is shown by an index using the tire in Comparative Example 1 as the reference. The greater the value, the better the abrasion resistance.

(2) Test of the tearing property

A sample of the size #3 in tension test in accordance with Japanese Industrial Standard K6301 was taken from tires which had been used for 100,000 km. Elongation of the sample was measured by using an INSTRON tensile tester. The result is shown by an index using the tire in Comparative Example 1 as the reference. The greater the value, the better the tearing property.

(3) Measurement of hysteresis loss property (heat buildup)

A sample having a length of 20 mm, a width of 4.7 mm, and a thickness of 2 mm was taken from a tire tread, and internal loss (tan δ) of the sample was measured by using a viscoelastic spectrometer at an input frequency of 52 Hz under repeated deformation of 2% at 50° C. The result is shown by an index using the tire in Comparative Example 1 as the reference. The greater the value, the better (the lower) the heat buildup.

Preparation Example of Carbon Black

Carbon black used in Examples 1 to 4 and Comparative Examples 1 to 4 were prepared by using the above apparatus for producing carbon black under the condition of the position of introduction of the feed stock oil, the total amount of the introduced air, the amount of the introduced feed stock oil, the pressure and the temperature of introduction of the feed stock oil, the position of introduction of cooling water to stop the reaction, and the amount of the introduced fuel and so on shown in Table 1. As the fuel, heavy fuel oil A having a specific gravity of 0.8622 (15° C./4° C.) was used. As the feed stock oil, heavy oil having the properties shown in Table 2 was used.

Example 1 to 4 and Comparative Example 1 to 4

Rubber compositions comprising various components were prepared by using carbon black prepared in Preparation Example of Carbon Black. Test tires of size 10.00R20 14PR were prepared by using the prepared rubber compositions, and various tests were conducted with the prepared tires. The basic formulation used in all of the Examples and Comparative Examples is as follows:

| rubber | 100.0 parts by weight |
| carbon black | 50.0 parts by weight |
| stearic acid | 2.0 parts by weight |
| zinc oxide | 3.5 parts by weight |
| antioxidant [1] | 2.0 parts by weight |

TABLE 1-1

| Preparation Example of Carbon Black | A | B | C | D |
|---|---|---|---|---|
| Condition of introduction of feed stock oil | | | | |
| introduced amount (liter/h) | 293 | 288 | 310 | 310 |
| spraying pressure | 20 | 18 | 18 | 18 |

TABLE 1-1-continued

| Preparation Example of Carbon Black | A | B | C | D |
|---|---|---|---|---|
| (kgf/cm²) | | | | |
| position of introduction[1] (mm), number of nozzle | 300,2 + 400,4 | 300,4 + 400,2 | 303,2 + 400,4 | 300,4 |
| preheating temperature (° C.) | 150 | 160 | 150 | 170 |
| Condition of introduction of air | | | | |
| total amount of introduced air (kg/h) | 2200 | 2200 | 2200 | 2200 |
| preheating temperature (° C.) | 600 | 600 | 600 | 600 |
| Amount of introduced fuel (kg/h) | 84 | 84 | 84 | 84 |
| Residence time (msec) | 82 | 53 | 50 | 125 |

[1]Distance from the upstream position of the reaction chamber.

TABLE 1-2

| Preparation Example of Carbon Black | E | F | G | H |
|---|---|---|---|---|
| Condition of introducing feed stock oil | | | | |
| introduced amount (liter/h) | 313 | 301 | 305 | 338 |
| spraying pressure (kgf/cm²) | 23 | 25 | 20 | 18 |
| position of introduction[1] (mm), number of nozzle | 100,4 + 200,2 | 200,4 | 200,4 + 300,4 | 100,4 + 200,4 |
| preheating temperature (° C.) | 200 | 220 | 180 | 160 |
| Condition of introduction of air | | | | |
| total amount of introduced air (kg/hr) | 2200 | 2200 | 2200 | 2200 |
| preheating temperature (° C.) | 600 | 600 | 600 | 600 |
| Amount of introduced fuel (kg/h) | 84 | 84 | 84 | 84 |
| Residence time (msec) | 25 | 22 | 28 | 53 |

[1]Distance from the upstream position of the reaction chamber.

TABLE 2

| | |
|---|---|
| specific gravity (JIS K2249[*1])(15/4° C.) | 1.1319 |
| kinematic viscosity (JIS K2283[*2])(cSt at 50° C.) | 26.7 |
| content of water (JIS K2275[*3])(%) | 0.5 |
| content of residual carbon (JIS K2270[*4])(%) | 11.6 |
| content of sulfur (JIS K2273[*5])(%) | 0.4 |
| content of carbon (%) | 90.1 |
| content of hydrogen (%) | 5.4 |
| BMCI[*6] | 160 |
| Properties in distillation (° C.) | |
| I.B.P.[*7] | 188 |
| temperature at 10% fraction | 234 |
| temperature at 30% fraction | 297 |
| temperature at 50% fraction | 360 |

[*1]Measured in accordance with the method of Japanese Industrial Standard K 2249.
[*2]Measured in accordance with the method of Japanese Industrial Standard K 2283.
[*3]Measured in accordance with the method of Japanese Industrial Standard K 2275.
[*4]Measured in accordance with the method of Japanese Industrial Standard K 2270.
[*5]Measured in accordance with the method of Japanese Industrial Standard K 2273.
[*6]BMCI: Bureau of Mines Correlation Index
[*7]I.B.P.: Initial Boiling Point

| | |
|---|---|
| vulcanization accelerator [*2] | 1.3 parts by weight |
| sulfur | 1.0 part by weight |

[*1] N-(1,3-dimethylbutyl)-N'-phenyl-p-phenylenediamine was used as the antioxidant.
[*2] N'-cyclohexyl-2-benzothiazylsulfenamide was used as the vulcanization accelerator.

The properties of carbon black used in the above tests and the results of the tests are shown in Table 3. In Comparative Example 1, a commercial carbon black (manufactured by CABOT Co., trade name: VULCAN 10H) was used.

Comparative Examples 5 and 6

The same procedures as those conducted in Example 1 were conducted by using carbon black shown in Table 3 in amounts outside the range of the present invention. The results are shown in Table 3.

In Examples 1 to 4, four types of carbon black in the range of the present invention were used. Particularly in Examples 1, 2, and 3, the tearing property was improved, and abrasion resistance and the heat buildup property were also remarkably improved. In Example 4, abrasion resistance and the tearing property were remarkably improved although heat buildup was about the same as that in Comparative Example 1.

TABLE 3-1

| Example | 1 | 2 | 3 | 4 |
|---|---|---|---|---|
| Rubber | | | | |
| natural rubber (parts by weight) | 70 | 70 | 70 | 70 |
| polybutadiene (parts by weight)[*1] | 30 | 30 | 30 | 30 |
| Carbon black (parts by weight) | 50 | 50 | 50 | 50 |
| Type of carbon black (Preparation Example of Carbon Black) | A | B | C | D |
| cetyltrimethylammonium bromide surface area CTAB (m²/g) | 144 | 150 | 131 | 127 |
| nitrogen adsorption specific surface area $N_2SA$ (m²/g) | 177 | 190 | 145 | 145 |
| iodine adsorption amount IA (mg/g) | 193 | 200 | 154 | 163 |
| dibutyl phthalate absorption amount DBP (ml/100 g) | 149 | 145 | 146 | 141 |
| most frequent value of aggregate diameter distribution $D_{mode}$ (nm) | 94 | 96 | 104 | 90 |
| half value width of aggregate diameter distribution $\Delta D_{50}$ (nm) | 77 | 85 | 84 | 74 |
| $\Delta D_{50}/D_{mode}$ | 0.819 | 0.885 | 0.808 | 0.822 |
| $N_2SA/IA$ | 0.916 | 0.949 | 0.943 | 0.889 |
| CTAB/IA | 0.764 | 0.750 | 0.851 | 0.779 |
| Properties of tire[*2] | | | | |
| abrasion resistance (index) | 120 | 116 | 112 | 110 |
| tearing property (index) | 103 | 101 | 101 | 106 |
| heat buildup property (index) | 105 | 103 | 102 | 100 |

[*1]A product of JAPAN SYNTHETIC RUBBER Co., Ltd., BR01
[*2]The properties of tires are shown by indices using the tire in Comparative Example 1 as the reference. The greater the value, the better the property, with respect to all properties.

TABLE 3-2

| Comparative Example | 1 | 2 | 3 | 4 | 5 | 6 |
|---|---|---|---|---|---|---|
| Rubber | | | | | | |
| natural rubber (parts by weight) | 70 | 70 | 70 | 70 | 70 | 70 |
| polybutadiene (parts by weight)[*1] | 30 | 30 | 30 | 30 | 30 | 30 |
| Carbon black (parts by weight) | 50 | 50 | 50 | 50 | 75 | 25 |
| Type of carbon black (Preparation Example of Carbon Black) | commercial | E | F | G | H | H |
| cetyltrimethylammonium bromide surface area CTAB ($m^2/g$) | 135 | 153 | 144 | 129 | 176 | 176 |
| nitrogen adsorption specific surface area $N_2SA$ ($m^2/g$) | 142 | 160 | 153 | 136 | 177 | 177 |
| iodine adsorption amount IA (mg/g) | 143 | 155 | 157 | 145 | 193 | 193 |
| dibutyl phthalate absorption amount DBP (ml/100 g) | 125 | 145 | 148 | 153 | 149 | 149 |
| most frequent value of aggregate diameter distribution $D_{mode}$ (nm) | 60 | 61 | 73 | 66 | 74 | 74 |
| half value width of aggregate diameter distribution $\Delta D_{50}$ (nm) | 42 | 39 | 49 | 52 | 62 | 62 |
| $\Delta D_{50}/D_{mode}$ | 0.700 | 0.639 | 0.671 | 0.789 | 0.838 | 0.838 |
| $N_2SA/IA$ | 0.993 | 1.030 | 0.973 | 0.938 | 0.916 | 0.916 |
| CTAB/IA | 0.944 | 0.985 | 0.916 | 0.892 | 0.911 | 0.911 |
| Properties of tire[*2] | | | | | | |
| abrasion resistance (index) | 100 | 114 | 115 | 97 | 125 | 69 |
| tearing property (index) | 100 | 90 | 91 | 100 | 78 | 115 |
| heat buildup property (index) | 100 | 94 | 100 | 108 | 70 | 135 |

[*1]A product of JAPAN SYNTHETIC RUBBER Co., Ltd., BR01
[*2]The properties of tires are shown by indices using the tire in Comparative Example 1 as the reference. The greater the value, the better the property, with respect to all properties.

A commercial carbon black corresponding to N134 Grade of ASTM was used in Comparative Example 1. Carbon black used in Comparative Example 2 had CTAB and DBP in the ranges of the present invention but other properties outside the ranges of the present invention. The result shows that the tearing property and the heat buildup property were markedly inferior. Carbon black used in Comparative Example 3 had CTAB, DBP, and CTAIB/IA in the ranges of the present invention but other properties outside the ranges of the present invention. The result shows a particularly inferior tearing property. Carbon black used in Comparative Example 4 had $D_{mode}$ and $\Delta D_{50}/D_{mode}$ outside the ranges of the present invention. The result shows inferior abrasion resistance. Carbon black used in Comparative Examples 5 and 6 had CTAB, $D_{mode}$, and CTAB/IA outside the ranges of the present invention. The result in Comparative Example 5 in which the amount of carbon black exceeded 70 parts by weight shows that the tearing property and the heat buildup property are particularly inferior. The result in Comparative Example 6 in which the amount of carbon black was less than 30 parts by weight shows particularly inferior abrasion resistance.

What is claimed is:

1. A rubber composition which comprises 100 parts by weight of a rubber component comprising at least one rubber selected from the group consisting of natural rubber and diene synthetic rubbers and 30 to 70 parts by weight of carbon black having
   (a) a cetyltrimethylammonium bromide surface area (CTAB) of 120 to 155 $m^2/g$,
   (b) a dibutyl phthalate absorption amount (DBP) of 135 to 170 ml/100 g,
   (c) a most frequent value of aggregate diameter distribution ($D_{mode}$) of 80 nm or more,
   (d) a ratio ($\Delta D_{50}/D_{mode}$) of a half value width of aggregate diameter distribution ($\Delta D_{50}$) to a most frequent value of aggregate diameter distribution ($D_{mode}$) of 0.80 to 1.00,
   (e) a ratio ($N_2SA/IA$) of a nitrogen adsorption specific surface area ($N_2SA$) to an iodine adsorption amount (IA) of 0.85 to 0.97, and
   (f) a ratio (CTAB/IA) of a cetyltrimethylammonium bromide surface area (CTAB) to an iodine adsorption amount (IA) of 0.70 to 0.90.

2. A rubber composition according to claim 1, which comprises 100 parts by weight of the rubber component and 40 to 60 parts by weight of the carbon black.

3. A rubber composition according to claim 2, wherein the rubber component is a blend of 40 to 90 parts by weight of at least one rubber selected from the group consisting of natural rubber and polyisoprene and 10 to 60 parts by weight of cis-1,4-polybutadiene.

4. A rubber composition according to claim 1, wherein the carbon black has a cetyltrimethylammonium bromide surface area (CTAB) of 125 to 150 $m^2/g$.

5. A rubber composition according to claim 1, wherein the carbon black has a dibutyl phthalate absorption amount (DBP) of 135 to 160 ml/100 g.

6. A rubber composition according to claim 1, wherein the carbon black has a ratio of a nitrogen adsorption specific surface area ($N_2SA$) to an iodine adsorption amount (IA) of 0.87 to 0.95.

7. A rubber composition according to claim 1, wherein the carbon black has a ratio of a cetyltrimethylammonium bromide surface area (CTAB) to an iodine adsorption amount (IA) of 0.75 to 0.85.

8. A pneumatic tire which comprises a tread prepared by using the rubber composition described in any one of claims 1 to 7.

9. The pneumatic tire for heavy duty according to claim 8.

* * * * *